United States Patent
Li et al.

(10) Patent No.: US 9,420,745 B2
(45) Date of Patent: Aug. 23, 2016

(54) CORN STALK MATERIAL, A METHOD AND APPARATUS FOR PREPARING IT

(71) Applicant: Shandong Tralin Paper Co., Ltd, Liaocheng (CN)

(72) Inventors: Hongfa Li, Liaocheng (CN); Xinsheng Hua, Liaocheng (CN); Yanjin Bi, Liaocheng (CN)

(73) Assignee: SHANDONG TRALIN PAPER CO., LTD., Liaocheng (CN)

( * ) Notice: Subject to any disclaimer, the term of this patent is extended or adjusted under 35 U.S.C. 154(b) by 149 days.

(21) Appl. No.: 13/894,657

(22) Filed: May 15, 2013

(65) Prior Publication Data

US 2014/0230395 A1 Aug. 21, 2014

(30) Foreign Application Priority Data

Feb. 20, 2013 (CN) .......................... 2013 1 0055308

(51) Int. Cl.
*A01D 41/06* (2006.01)
*A01D 82/00* (2006.01)
*D21B 1/02* (2006.01)

(52) U.S. Cl.
CPC ................ *A01D 82/00* (2013.01); *D21B 1/025* (2013.01)

(58) Field of Classification Search
CPC ............ B27J 1/00; B27N 1/00; A01D 41/06; A01D 41/02; A01D 47/00; A01D 61/00; A01D 82/00; A01F 11/06; A01F 12/446; A01F 12/40; A01F 12/18; A01F 12/20; A01F 7/02; A01F 7/04; D21B 1/025
USPC .............................. 56/1, 54–60; 460/100–106
See application file for complete search history.

(56) References Cited

U.S. PATENT DOCUMENTS

2004/0256065 A1 12/2004 Ahmed et al.

FOREIGN PATENT DOCUMENTS

| CN | 2932967 A | 8/2007 |
|---|---|---|
| CN | 201234470 Y | 5/2009 |
| CN | 101811316 A | 8/2010 |
| CN | 201690802 U | 1/2011 |
| CN | 102490238 A | 6/2012 |
| CN | 102498820 A | 6/2012 |

*Primary Examiner* — Robert Pezzuto
(74) *Attorney, Agent, or Firm* — Buchanan Ingersoll & Rooney PC

(57) ABSTRACT

This invention is to a corn stalk material and its preparation method and apparatus. The corn stalk material is the peel of the corn stalk which is one or more materials selected from the group consisting of a silk-shaped peel of the corn stalk and a strip-shaped peel of the corn stalk with residual pulp of the corn stalk. The method for the corn stalk material includes the following steps: 1) using an agricultural harvester to harvest the corn stalk; 2) when harvesting, the corn stalk being separated, and obtaining a pulp, a leaf and a peel of the corn stalk respectively; 3) collecting peel of the corn stalk when a moisture content is 15~45%; The collected pulp and leaf of the corn stalk are as feed, or fermented to produce lactic acid or alcohol.

14 Claims, 6 Drawing Sheets

Bleaching process parameters of the corn stalk pulp

| | Chlorine dosage or Alkali dosage% | Pulp concentration % | Terminal pH | Temperature °C | Time min |
|---|---|---|---|---|---|
| C stage | 65 in the total amount of chlorine | 3 | <2 | room temperature | 30 |
| E stage | 2 in the pulp | 5 | 11 | 60 | 80 |
| H stage | 35 in the total amount of chlorine | 5 | 9 | 40 | 90 |

FIG. 4

Bleaching process parameters of the corn stalk pulp

|  | Chlorine dosage or Alkali dosage% | Pulp concentration % | Terminal pH | Temperature °C | Time min |
|---|---|---|---|---|---|
| C stage | 65 in the total amount of chlorine | 3 | <2 | room temperature | 30 |
| E stage | 2 in the pulp | 5 | 11 | 60 | 80 |
| H stage | 35 in the total amount of chlorine | 5 | 9 | 40 | 90 |

FIG. 5

Performance results of the bleached pulp of the corn stalk

| Sample | Opacity % | Yellowing value % | Tensile index N·m/g | Burst index kPa·m$^2$/g | Tear index mN·m$^2$/g | Folding endurance times |
|---|---|---|---|---|---|---|
| Experiment | 77.3 | 0.712 | 25.32 | 2.18 | 6.97 | 10 |
| Comparison 1 | 77.5 | 0.704 | 19.46 | 1.46 | 4.89 | 7 |
| Comparison 2 | 80.8 | 0.734 | 23.37 | 1.97 | 5.13 | 23 |

FIG. 6

High temperature test results

| Time(d) | Batch | musty | mildew |
|---|---|---|---|
| 0 | Batch1 | No | No |
| | Batch2 | No | No |
| | Batch3 | No | No |
| | Comparison1 | No | No |
| | Comparison2 | No | No |
| 5 | Batch1 | No | No |
| | Batch2 | No | No |
| | Batch3 | No | No |
| | Comparison1 | Yes | Yes |
| | Comparison2 | Yes | Yes |
| 10 | Batch1 | No | No |
| | Batch2 | No | No |
| | Batch3 | No | No |
| | Comparison1 | Yes | Yes |
| | Comparison2 | Yes | Yes |
| 15 | Batch1 | No | No |
| | Batch2 | No | No |
| | Batch3 | No | No |
| | Comparison1 | Yes | Yes |
| | Comparison2 | Yes | Yes |

FIG. 7

High humidity test results

| Time(day) | Batch | musty | mildew |
|---|---|---|---|
| 0 | Batch1 | No | No |
| | Batch2 | No | No |
| | Batch3 | No | No |
| | Comparison 1 | No | No |
| | Comparison 2 | No | No |
| 5 | Batch1 | No | No |
| | Batch2 | No | No |
| | Batch3 | No | No |
| | Comparison 1 | Yes | Yes |
| | Comparison 2 | Yes | Yes |
| 10 | Batch1 | No | No |
| | Batch2 | No | No |
| | Batch3 | No | No |
| | Comparison 1 | Yes | Yes |
| | Comparison 2 | Yes | Yes |
| 15 | Batch1 | No | No |
| | Batch2 | No | No |
| | Batch3 | No | No |
| | Comparison 1 | Yes | Yes |
| | Comparison 2 | Yes | Yes |

FIG. 8

High temperature and humidity test results

| Time (day) | Batch | musty | mildew |
|---|---|---|---|
| 0 | Batch1 | No | No |
| | Batch2 | No | No |
| | Batch3 | No | No |
| | Comparison 1 | No | No |
| | Comparison 2 | No | No |
| 5 | Batch1 | No | No |
| | Batch2 | No | No |
| | Batch3 | No | No |
| | Comparison 1 | Yes | Yes |
| | Comparison 2 | Yes | Yes |
| 10 | Batch1 | No | No |
| | Batch2 | No | No |
| | Batch3 | No | No |
| | Comparison 1 | Yes | Yes |
| | Comparison 2 | Yes | Yes |
| 20 | Batch1 | No | No |
| | Batch2 | No | No |
| | Batch3 | No | No |
| | Comparison 1 | Yes | Yes |
| | Comparison 2 | Yes | Yes |
| 30 | Batch1 | No | No |
| | Batch2 | No | No |
| | Batch3 | No | No |
| | Comparison1 | Yes | Yes |
| | Comparison2 | Yes | Yes |

CORN STALK MATERIAL, A METHOD AND APPARATUS FOR PREPARING IT

FIELD OF THE INVENTION

The present invention relates to a corn stalk material, more particularly, relates to a corn stalk material, a method and apparatus for preparing it.

BACKGROUND

Both Corn stalk and wood are renewable lignocelluloses resources accumulated by photosynthesis, but wood is used widely, while most of corn stalk is incinerated or discarded. It is the most important reason that the corn stalk is of heterogeneity, which contains peel, pulp and leaves and so on in certain proportion, and with different chemical compositions and fiber morphology. The corn stalk used in the present invention is respectively produced in Yanshou county, Heilongjiang Province and Gongzhuling, Jilin Province. Analysis of the two kinds of stalk is showed in the following table, as the amount of leaves and pulp takes up more than 60% of the total corn stalk. The corn stalk leaves have low mechanical strength, and could be crushed into powder easily; the corn stalk pulp has low density, high hydroscopicity and low mechanical strength; the peal has the highest fiber content and the highest mechanical strength in all parts of corn stalk, but the quantity is relatively low. At present, the comprehensive utilization of corn stalk is still in the low level in terms of the degree of the process. The fiber with high mechanical strength and good toughness is only found in the corn stalk peal, while the nutrient contents are found in the corn stalk leaves and pulp. In normal conditions, the outer peel and the inner pulp of the corn stalk are mutually interfered, so it is difficult to have new applications. Therefore, how to separate the peel and pulp, extending its applied fields, improving its application performance and raising its value has became the key factors comprehensive utilization of corn stalk.

|  | Mass fraction | | |
| --- | --- | --- | --- |
| Origin | Corn stalk leaves | Corn stalk peel | corn stalk pulp |
| Gongzhuling, Jilin Province | 52.9 | 30.7 | 16.4 |
| Yanshou county, Heilongjiang Province | 49.2 | 35.2 | 15.4 |
| Average | 51.2 | 32.9 | 15.9 |

CN102490238A discloses a method of processing the corn stalk about separating the corn stalk peel from the pulp. The invention solves the technical problems of the mutual interference of the outer peel and the inner pulp of the corn stalk; and the quality of the plate material prepared by the corn stalk is reduced to a large extent because of the existence of the pulp. The method includes the following steps: 1. smashing the corn stalk primarily separated by the traditional separator; 2. removing hard parts and dust of the smashed corn stalk by screening; 3. smashing the smashed corn stalk processed in the step 2 again, then drying; and 4. screening the smashed corn stalk processed in the step 3 by 10-50 meshes point, then winnowing the smashed corn stalk went through the different meshes to separate the corn stalk peel from pulp. The final peel purity of the smashed corn stalk peel is more than 90%. Therefore the obtained peel is suitable to serve as a raw material used for producing the plate of the smashed corn stalk peel.

It is reported that, after separation of peel from pulp, the peel having high lignocelluloses content which can replace wood, reeds, etc. and is suitable to serve the raw material for papermaking. Pulp containing more sugar, protein and starch can be used as the super roughage for ruminants such as cows and sheep.

The effect of present separator is not ideal. The corn stalk need to be assembled before separation, large amount of manpower and material resources are wasted, also the corn stalk is not utilized enough.

The storage of the corn stalk also has many problems. At present, the main storage methods of the corn stalk include outdoor storage, shed storage, drying, sun drying, silage, micro storage or ammoniation, etc. The methods for storing the corn stalk by drying and shed storage are advantageous for the preservation of the CP (crude protein) and the other nutrients likewise the WSC. And outdoor storage is the most undesirable way. At present, there are the following problems in micro storage of the corn stalk: ①Temperature: The micro storage is often operated after the busy farming season, when the field crop has been harvested and storied. It is generally around the middle of November when temperature is below 0° C. with bad climate for the breed and fermentation of lactic acid bacteria species; ② Water: The content of corn stalk water is not accurately considered as adding water, while the moisture required in the process of micro storage lacks of scientific calculation and strict control; ③ Bacterial pollution: In the process, it is hard to achieve quick storage. The process could even last a few days, and increase the pollution probability by other kinds of bacterial. ④ Sealing: If the corn stalk is not compressed enough in the process of loading pit, breathable and leakage phenomenon would occur after the pit was sealed up. ⑤ Workforce: The operation of micro storage, silage and ammoniated are often operated after the busy farming season, when the crops have been harvested and storage. Farmers are busy with the harvesting, and have no time to collect, transport and do other basic work of micro storage, silage and ammoniated. ⓒ When the moisture content of the harvested corn stalk is above 70%, compress and package would cause mildew. Whole plant transport would cause less loading capacity and more transportation costs.

Kneading technology and baling technology are new processing methods of the corn stalk in recent years. The kneading technology for the corn stalk changes the traditional transverse cut into the longitudinal kneading. And the corn stalk is processed into soft filamentous forage grass. The epidermis structure of the corn stalk is destroyed after kneading process; the forage grass could get soft and have good palatability. Therefore feeding rate can be improved.

However, the above techniques are only used in making the corn stalk into the forage grass by kneading, which greatly limits the application range of the corn stalk. In addition, the pulp is not removed by the kneading technology, so all of the corn stalk pulp exists in the soft filamentous grass prepared by the corn stalk. The pulp contains a certain amount of xylans hemicelluloses, which could be oxidized into carbonyl chromospheres or carboxyl auxochromes by light and oxygen. If the soft filamentous grass is used in papermaking, it will cause serious yellowing phenomenon. Otherwise, as the pulp is brittle, the existence of pulp will cause paper tear index decline in some extent.

Therefore, the separation of the peel, pulp and leaves on a large scale to provide a performance improved corn stalk material, extending its applied fields, improving its properties and raising its values will be the key factors comprehensive utilization of corn stalk.

SUMMARY OF THE INVENTION

To solve the above problem, a prime objective of the present invention is to provide a corn stalk material, which could solve the problems of storage and transportation, and improve the usability, extend the application fields, raise the values in use, and achieve massive procurement and industrial utilization.

Additionally, the invention provides a harvesting and storing method for the corn stalk material. The method could achieve the whole process from harvesting to storing corn stalk through operating in field, which substantively saves the labor force and costs. And the method could also achieve to tear, crush and separate the peel from the pulp of the corn stalk; the separation rate is up to 95% and the cleanly rate is up to 99%, Thus achieve the goal of making full use of the corn stalk.

For the purpose of obtaining the corn stalk material and implementing the harvesting and storing method for the corn stalk material, it is important to select corollary apparatus rationally. Accordingly, the invention also provides an apparatus for preparing the corn stalk material or being applied to the harvesting and storing method for the corn stalk material. The apparatus separates the peel from the pulp of the corn stalk in harvesting the corn stalk, when the apparatus operations in field.

In order to realize the main objects of the invention, the present invention adopts the following technical scheme:

A corn stalk material, wherein the corn stalk material is the peel of the corn stalk which is one or more materials selected from the group consisting of a silk-shaped peel of the corn stalk and a strip-shaped peel of the corn stalk with residual pulp of the corn stalk.

In the corn stalk material in the invention, the content of the residual pulp on the strip-shaped peel is less than 5%, preferably less than 3%, more preferably 0.5~2.5%.

A fiber fineness of the peel of the corn stalk is 38~42 tex, preferably 39~41 tex, more preferably 41.33 tex; an average width is 82~88 µm, preferably 84~86 µm, more preferably 85.076 µm; the content of a fiber with the average width greater than or equal to 70 µm is 60~65%, preferably 62~64%, more preferably 63.433%.

In the present invention, the silk-shaped peel of the corn stalk comprises a unattached silk-shaped peel of the corn stalk and a bundle of a silk-shaped peel binding to the peel of the corn stalk after separating the peel from the pulp; a length of the strip-shaped peel of the corn stalk is less than 45 cm; further, the bundle of the silk-shaped peel of the corn stalk comprises the bundle of the silk-shaped peel binding to a connection of a nodule with the peel of the corn stalk, or the silk-shaped peel of the corn stalk partially continuously binding to the peel of the corn stalk; furthermore, there are partially continuous cracks on the peel of the corn stalk along the longitudinal direction.

In the present invention, the corn stalk material also comprises a free pulp separated from the peel of the corn stalk; further, the corn stalk material also comprises a separated leaf.

A harvesting and storing method of the corn stalk includes the following steps:
1) using an agricultural harvester to harvest the corn stalk.
2) at the same time, the corn stalk being separated by the mechanical method of extrusion, grind and rub, tear, crush or kneading, and obtaining a pulp, a leaf and a peel of the corn stalk respectively; preferably the corn stalk being tore, crushed, and separated by a separating unit of the agricultural harvester, and obtaining a pulp, a leaf and a peel of the corn stalk.
3) collecting a fibrous materials for papermaking, power generation or fiber when a moisture content of the peel of the corn stalk obtained from step 2) is 15~45%; the collected pulp and leaf of the corn stalk being as feed, or fermented to produce lactic acid or alcohol.

In the harvesting and storing method for the corn stalk, the collecting when the moisture content of the peel of the corn stalk is 15~45% in step 3) refers to: collecting and packing when the moisture content is up to 15~45% by sun drying or air drying; preferably, when sun drying or air drying is proceeding, an initial moisture content of the peel of the corn stalk is 50%~75%, and stopping sun drying or air drying when a final moisture content is up to 15~45%.

In the prior art, it is not only difficult to transport and store the whole plant of the corn stalk, but also it is a lot decomposed in the process of transport and storage; and because the pulp is not removed before the kneading process, the existence of the pulp of the corn stalk will cause serious yellowing phenomenon and the decline of paper performance when the corn stalk is used in papermaking. Consequently, the peel of the corn stalk obtained through the kneading technology is restricted to replace forage grass as winter food of cattle and sheep, and its application field is limited.

The present invention provide a corn stalk material, wherein, the corn stalk material is a peel of the corn stalk which is one or more materials selected from the group consisting of a silk-shaped peel of the corn stalk and a strip-shaped peel of the corn stalk with residual pulp of the corn stalk. Most of the pulp has been removed, and only a little pulp is left, so the residue of the pulp on the peel of the corn stalk is less than 5%. Thereby, the content of xylans cellulose greatly reduces and the mildewing rate reduces as well. The corn stalk material in the present invention can be widely used in papermaking filed. When it is applied in papermaking field, the probability of yellowing phenomenon is greatly reduced, and the tests show that the corn stalk with a little pulp can improve the performance of the paper.

The corn stalk material is obtained by the harvesting and storing method in the present invention.

The corn stalk material comprises the peel of the corn stalk. Further the corn stalk material includes the separated pulp and/or leaf of the corn stalk. Among the corn stalk material, the content of the peel of the corn stalk is 25~35 wt %, the content of the leaf is 55~60 wt %, and the content of the pulp of the corn stalk is 3~7 wt %, and the other components are the rest. A partial pulp and/or leaf are turned into small fragment and powder by the mechanical method such as extrusion, grind and rub, crush or kneaded. It is difficult to distinguish the pulp of the corn stalk from the leaf. The other components in the present invention are the small fragment and powder, etc.

The peel of the corn stalk includes the silk-shaped peel of the corn stalk and the strip-shaped peel of the corn stalk. The content of the silk-shaped peel of the corn stalk is 45~65 wt %, and the content of the strip-shaped peel of the corn stalk is 35~55 wt %.

The pulp of corn stalk includes the free pulp separated from the peel of the corn stalk and a bonding pulp being residual in the strip-shaped peel of the corn stalk. In the mechanical process of extrusion, grind and rub, crush or kneaded and so on, most of the pulp is stripped from the peel to be the free pulp separated from corn stalk, and a little pulp is not stripped from the peel to be the bonding pulp being residual in the peel of the corn stalk.

The content of the free pulp is 2.5~4.5 wt %, and the content of the bonding pulp is 0.5~2.5 wt %.

The free pulp is in the shape of granular or lump.

The corn stalk mainly consists of plant cell wall, and the essential components comprise cellulose, hemicellulose and lignin etc. Cellulose is macromolecular polysaccharide which consists of glucose units, insoluble in water and general organic solvent, and it is an important papermaking material. In the present invention, the corn stalk material contains cellulose, hemicellulose and lignin etc. Because of the different growth cycle of the corn stalk, the content of each component in the corn stalk material is also different, which is prepared by the harvesting and storing method in the present invention and using the corn stalk harvested in different periods. As follows:

The corn stalk is harvested and processed by the harvesting and storing method in the present invention when 3~5 leaves of the plant turn yellow and the stalk of the plant does not turn yellow. The mass percent of the major components in dry weight is as follows:

Cellulose 34~53%, preferably 34~52.3%, more preferably 40~51.8%, the most preferably 45~51.7%, optimally 48~51.7%.

Hemicelluloses 16~35%, preferably 17~32%, more preferably 18~25.5%, the most preferably 18~24.5%, optimally 18.5~21.2%.

Lignin 10~16.3%, preferably 13~16.3%, more preferably 13~16%, the most preferably 13~14.5%.

Soluble sugar 2~14.5%, preferably 2~12.5%, more preferably 2~11.5%, the most preferably 2~10.2%, optimally 2.4~6.0%.

The corn stalk material in the present invention also contains benzene-alcohol extraction and ash. The mass percent of benzene-alcohol extraction in dry weight is 4~6.7%, preferably 4.5~6.3%, more preferably 4.7~5.2%. the mass percent of ash in dry weight is 2~8.5%, preferably 2~5%, more preferably 3.5~4.5%.

The crystallinity of cellulose in the corn stalk material is 40~55%, preferably 45~50%.

The corn stalk being still green is harvested and processed by the harvesting and storing method in the present invention, after the corn has been harvested for 1~15 days. The mass percent of the major components in dry weight is as follows:

Cellulose 33~49%, preferably 35~47%, more preferably 35~47%, the most preferably 42~47%, optimally 43~47%.

Hemicelluloses 15~27%, preferably 20~25%, more preferably 20.5~25%, most preferably 21~25%, optimally 21.3~25%.

Lignin 11~13.3%, preferably 12~13.3%.

Soluble sugar 2~12%, preferably 2~10%, more preferably 2~8%, the most preferably 3~6%.

The corn stalk material in the present invention also contains benzene-alcohol extraction and ash. The mass percent of benzene-alcohol extraction in dry weight is 3~8%, preferably 3.5~7.5%, more preferably 5~7.2%. The mass percent of ash in dry weight is 4~11%, preferably 4.5~10.5%, more preferably 5.5~8%.

The crystallinity of cellulose in the corn stalk material is 38~51%, preferably 42~48%.

The corn stalk is harvested and processed by the harvesting and storing method in the present invention when all leaves of the plant turn yellow and 70%~100% of the stalk turns yellow. The mass percent of the major components in dry weight is as follows:

Cellulose 50~59%, preferably 51~58%, more preferably 51.5~57.5%, the most preferably 52~57%.

Hemicelluloses 15~20%, preferably 16~19%, more preferably 16.5~18%, the most preferably 17~18%.

Lignin 11~17.5%, preferably 12~18.5%, more preferably 15~18%, the most preferably 16~18%.

Soluble sugar 1.5~17%, preferably 3~14%, more preferably 1.6~12%, the most preferably 1.8~10%, optimally 2.2~6%.

The corn stalk material in the present invention also contains benzene-alcohol extraction and ash. The mass percent of benzene-alcohol extraction in dry weight is 1.5~7%, preferably 2.1~3.8%. The mass percent of ash in dry weight is 2~8%, preferably 2.5~5.5%.

The crystallinity cellulose in the corn stalk material is 45~50%, preferably 48~50%.

For the purpose of obtaining the corn stalk material by the harvesting and storing method, it is important to choose the corresponding apparatus rationally. At present, there are lots of apparatus for processing the corn stalk in the market. Scientificalness and effectiveness should be paid attention to when choosing the apparatus. So the corresponding apparatus is able to work at the maximum efficiency to ensure the continuity of production, and achieve the best productivity index. Because of harvesting the crop stalk in the field, the chosen apparatus should be able to work in the process of walking. So the apparatus can move conveniently and flexibly to realize the field operation. In the present invention, the agricultural harvester is employed, which can separate the peel, pulp and leaf of the corn stalk from each other when harvesting the corn stalk. And separating unit for peel, pulp and leaves is installed on the agricultural harvester. The apparatus can adopt a variety of mechanical methods, such as extrusion, grind and rub, tear, crush or kneading, to achieve the separation effect of the pulp, peel and leaf of the corn stalk. The corn stalk after being processed in the present invention is dried in the field. The influence of air oxidation, ultraviolet light and other factors have germicidal properties. Through sterilizing process such as air oxidation, ultraviolet light, the prepared corn stalk material does not easily mildew, and its shelf life is extended. And oxidation decomposition of sugars and proteins in the corn stalk is accelerated; subsequently it can further reduce the impurities content in fiber materials, and further improve cellulose content. Thus the corn stalk material is mote adapted for industrial applications such as papermaking.

The apparatus used in the present invention is an agricultural harvester. The agricultural harvester comprises a chassis 4, a power plant, an electrical installation, a hydraulic system, a cab 5, a cutting table 1 for harvesting the crops located in the front of the chassis of the agriculture harvester, a separating unit 3 for separating the crop stalk and a conveyer 2 for conveying the crop stalk between the said units, wherein, the separating unit is used for crushing the crop stalk and separating the peel, pulp and leaf of the crop stalk from each other, and the separating unit comprises a rotatable structure with multiple teeth on the peripheral which can crush the corn stalk and the sorghum stalk, and a structure with apertures through which the crushed pulp and leaf is leaked. A fastener is used for connecting the structure each other or the structure with the chassis. The connection strength should be ensured to avoid accident in the process of harvesting the crop stalk.

The separating unit 3 is used for tearing, crushing, and separating the peel, pulp and leaf of the corn stalk from each other. The conveyer 2 is used for conveying the harvested corn stalk to the separating unit 3 which is used for tearing, crushing and separating the peel, pulp and leaf of the corn stalk from each other.

The separating unit 3 comprises an axial-flow drum 11 for tearing, crushing, separating the peel, pulp and leaf of the corn stalk from each other, and a sieve 12 for leaking the separated pulp and leaf.

The axial-flow drum 11 has multiple teeth for tearing, crushing and separating the peel, pulp and leaf of the corn stalk from each other.

The teeth comprise one or several kinds of teeth selected from the group of the threaded rod teeth, spike teeth or flat teeth.

The sieve 12 has multiple apertures for leaking the separated pulp and leaf of the corn stalk.

The cutting table 1 has cutters A. The cutters A are inclined downwardly at an angle in the horizontal direction, thus it is avoided that the corn stalk being cut by the cutters A is cut again before entering the harvester, and a part of the stalk falls to the ground instead of entering the harvester and can not be crushed.

The separating unit 3 further includes a dispersion device 6 for the peel of the corn stalk.

The dispersion device 6 can avoid the adhesion of the peel of the corn stalk and guide the peel of the corn stalk scattering on one side of the harvester. So it is avoided that the peel of the corn stalk scattering on the ground will be rolled by rear wheel of the harvester. It is convenient for harvest and storage.

The dispersion device 6 is fixed to an outlet of the axial-flow drum 11, such that the strip-shaped peel of the corn stalk is dispersed. The dispersion device 6 comprises a shell and rotatable blades in the shell. An inlet of the shell matches with the outlet of the axial-flow drum 11. The blades are connected to the power plant of the agriculture harvester.

The separating unit 3 further has an anti-blocking mechanism 7.

Since the moisture content of the corn stalk is high when harvesting, the separated pulp and leaves are wet. When passing through apertures of the sieve 12, the pulp and leaves plug the sieve 12 easily. The anti-blocking device 7 can make the separated pulp and leaves fall smoothly.

The anti-blocking device 7 located at the bottom of sieve 12 is a drum structure. The drum structure has circular teeth. The drum structure is connected with the power plant of agriculture harvester. Driven by the power plant, the drum structure continuously rotates to clear up the pulp and leaves of the corn stalk deposited at the bottom of sieve 12.

The agriculture harvester further comprises an auger 8 of the cutting table, a chain harrow assembly 9, a tangential flow drum 10, a reciprocating sieve plate 13, a dispensing auger 14 and a fan 15.

A rotating speed of the axial-flow drum 11 is critical to achieve tearing, crushing and separating the peel, pulp and leaf of the corn stalk from each other. In the present invention, rotating speed of the axial-flow drum 11 is 900~1000 r/min, preferably 950~1000 r/min.

There is a certain gap between the axial-flow drum 11 and the sieve 12.

It is important to regulate the gap between the axial-flow drum 11 and the sieve 12, according to the moisture condition of the crop, in order to get better separation effect. Thereby the gap has four gears which are 5 mm, 10 mm, 15 mm and 20 mm. When the crop is wet, a smaller gap between the axial-flow drum 11 and the sieve 12 should be chosen. When the crop is dry, a bigger gap between the axial-flow drum 11 and the sieve 12 should be chosen.

The present invention has the following advantages compared with the prior art:

(1) The corn stalk with the whole plant can not be purchased by a large amount, so large-scale industrial application is impossible. The corn stalk material in the present invention can be purchased by a large amount, so large-scale industrial application can be realized.

(2) The transportation capacity of the corn stalk with the whole plant is small. The corn stalk material in the present invention has large transportation capacity. Vehicles with equal loading capacity can load 35 tons of the corn stalk material in the present invention instead of 13 tons of the corn stalk with the whole plant.

(3) The corn stalk with the whole plant can only be stored for 350 kg/m$^2$, while the corn stalk material in the present invention can reached 1 ton/m$^2$ in the same area and stockpile height.

(4) After the harvest, it costs 150 CNY/Mu to grind and return the corn stalk to the field (rotary tillage); it costs 100 CNY/Mu to get the corn stalk material in the present invention after industrial harvesting, separating, packaging, recycling and rotary tillage.

(5) The corn stalk material in the present invention facilitates storage and transportation, is not susceptible to moldy, and the shelf life is extended. The corn stalk material in the present invention is more suitable for the papermaking field. The probability of yellowing phenomenon is greatly reduced. And the tests show that the corn stalk can improve paper performance after removing the most pulp.

(6) The preparation method in the present invention could achieve the whole process from harvesting to storage of the corn stalks by means of field operations, thus it substantively saves labor force and material cost. This process could achieve to tear, crush and separate the peel of the corn stalk from the pulp. The separation rate is up to 95% and the cleanly rate is up to 99%. The moisture content of the separated peel of the corn stalk is less than 30% after sun drying, which could prevent from mildewing and rotting effectively;

(7) The agriculture harvester in the present invention could separate the peel, pulp and leaves of the corn stalk from each other, and then packing, storing, transporting, and utilizing them respectively. Thus the utilization value of the corn stalk could significantly increase.

1—cutting table, 2—conveyer, 3—a separating unit 3, 4—chassis, 5—cab, 6—dispersion device, 7—anti-blocking device, 8—auger of the cutting table, 9—chain harrow assembly, 10—tangential flow drum, 11—axial-flow drum, 12—sieve, 13—reciprocating sieve plate, 14—dispensing auger, 15—fan.

FIG. 4 describes bleaching process parameters of the corn stalk pulp;

FIG. 5 summarizes performance results of the bleached pulp of the corn stalk;

FIG. 6 describes high temperature test results;

FIG. 7 describes high humidity test results;

FIG. 8 describes high temperature and humidity test results.

DETAILED DESCRIPTION OF THE INVENTION

The following is embodiments of the present invention which further describes the technical scheme rather than limiting the scope of the claims.

Example 1

A corn stalk material, wherein, the corn stalk material comprises the peel of corn stalk; the peel of the corn stalk comprises a silk-shaped peel of the corn stalk and a strip-shaped peel of the corn stalk with the residual pulp of the corn stalk; the content of the residual pulp on the strip-shaped peel is less than 0.5%.

The mass percent of the strip-shaped peel of is 33.3 wt %, and the mass percent of the silk-shaped peel of the corn stalk is 66.7 wt %.

Figure 1:
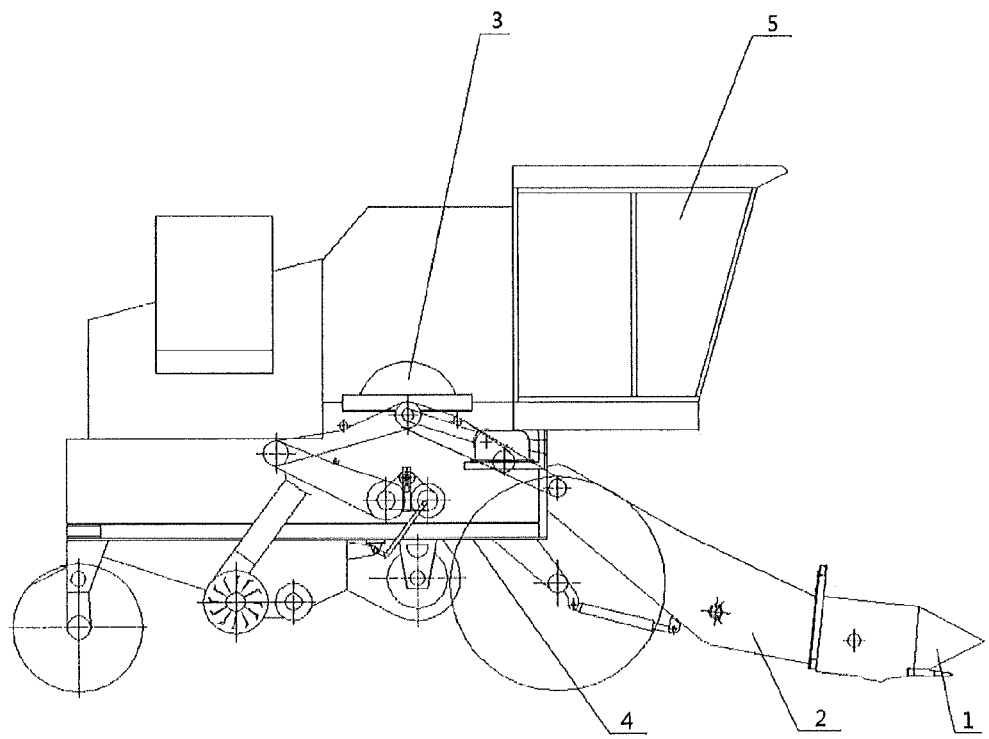
FIG. 1 is a structure of the agricultural harvester of the present invention.
Figure 2:
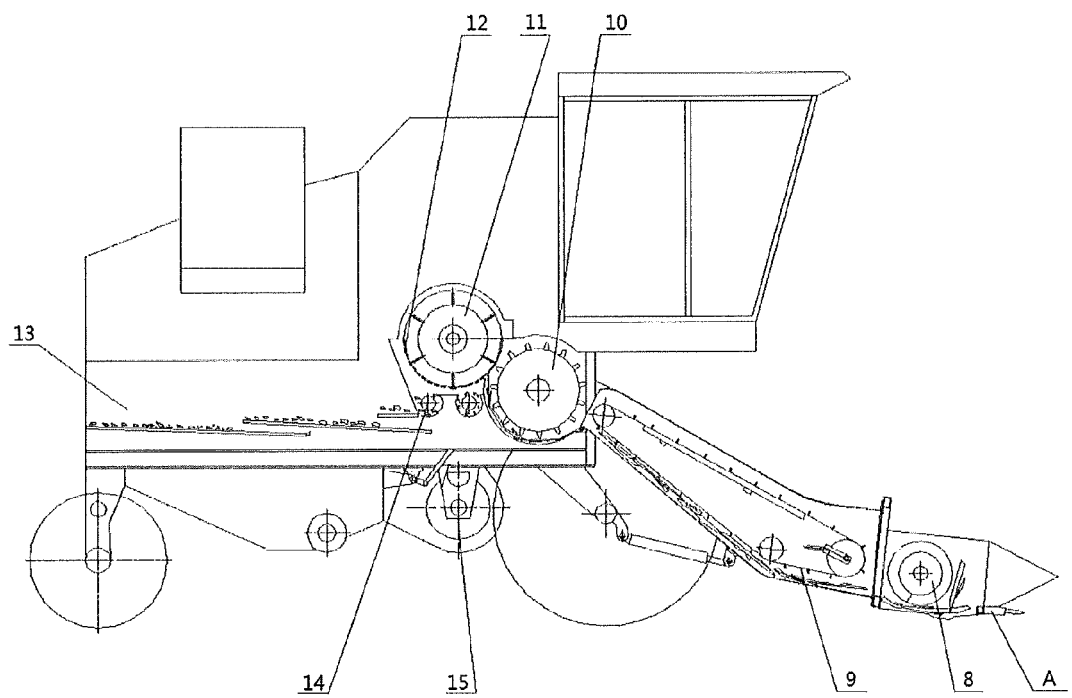
FIG. 2 is a schematic diagram of the agricultural harvester for transporting the corn stalk in the present invention.

The corn stalk material is prepared by the following steps:

1) Using the agricultural harvester to harvest the corn stalk in the mature stage on farmland;

2) at the same time, the corn stalk is tore, crushed and separated to get the pulp, leaves and the peel of the corn stalk respectively by the separating unit of the agricultural harvester (as shown in FIGS. 1 and 2) for separating the corn stalk in the present invention.

3) collecting the corn stalk material for papermaking, power generation and fiber when the moisture content of the peel of the corn stalk obtained in step 2) is 15%; the collected pulp and leaves of the corn stalk are as fodder or fermented to produce lactic acid or alcohol.

In order to obtain the corn stalk material by the above steps, it is important to select corresponding apparatus rationally. As shown in FIGS. 1 and 2; the agricultural harvester in the embodiment, comprises a chassis 4, a power plant, an electrical installation, a hydraulic system, a cab 5, the cutting table 1 for harvesting the crops located in the front of the chassis of the harvesting harvester, a separating unit for separating the crops stalk and a conveyer for conveying the crops stalk between these devices, wherein, the separating unit is used for crushing the crops stalk and separating the peel, pulp and leaves of the crops stalk from each other, It comprises a rotatable structure with multiple teeth on the peripheral which can crush corn stalk and sorghum stalk, and a structure with apertures through which the crushed pulp and leaves is leaked. A fastener is used for connecting the structures with each other or the structure with chassis. The connection strength should be ensured to avoid accident in the process of corn stalk harvesting.

The separating unit 3 is used for tearing, crushing and separating the peel, pulp and leaves of the corn stalk from each other. The conveyer 2 is used for conveying the harvested corn stalk to the separating unit 3 which is used for tearing, crushing and separating the peel, pulp and leaves of the corn stalk from each other.

The separating unit 3 comprises an axial-flow drum 11 used for tearing, crushing, separating the peel, pulp and leaves of the corn stalk from each other, and a sieve 12 for leaking the separated pulp and leaves.

The axial-flow drum 11 has multiple teeth for tearing, crushing and separating the peel, pulp and leaves of the corn stalk from each other.

The teeth comprise one or several kinds of teeth selected from the group of the threaded rod teeth, spike teeth or flat teeth.

The sieve 12 has multiple apertures for leaking the separated pulp and leaves of the corn stalk.

The cutting table 1 has cutters A. The cutters A are inclined downwardly at an angle in the horizontal direction, thus it is avoid that the corn stalk being cut by the cutters A is cut again before entering the harvester, and a part of the stalk falls to the ground instead of entering the harvester and can not be crushed.

The dispersion device 6 is fixed to an outlet of the axial-flow drum 11, such that the strip-shaped peel of the corn stalk is dispersed. The dispersion device 6 comprises a shell and rotatable blades in the shell. An inlet of the shell matches with the outlet of the axial-flow drum 11. The blades are connected with the power plant of the agriculture harvester. The strip-shaped peel of the corn stalk discharged from the separating unit is disposed on the ground randomly, such that the strip-shaped peel of the corn stalk might be rolled by the rear wheel of the harvester. Meanwhile, the peel of the corn stalk has higher hardness, and the interconnection of the fiber is good, so stacking phenomena may occur, and it is inconvenient to dry. Therefore, the dispersion device 6 is added, in which the blades are installed to disperse the peel of the corn stalk driven by the power plant, and the shell can guide the dispersed peel of the corn stalk to one side of the harvester. Thereby, the peel of the corn stalk will not be rolled by the rear wheel of the harvester, and it is convenient for drying and packing.

The agriculture harvester further comprises an auger 8 of the cutting table, a chain harrow assembly 9, a tangential flow drum 10, a reciprocating sieve plate 13, a dispensing auger 14 and a fan 15.

Rotating speed of the axial-flow drum 11 is critical to the realization of tearing, crushing and separating the peel, pulp and leaves of the corn stalk from each other. In the embodiment, rotating speed of the axial-flow drum 11 is 950 r/min.

There is certain gap between the axial-flow drum 11 and the sieve 12. It is important to regulate the gap between the axial-flow drum 11 and the sieve 12, according to moisture condition of the crops, to order to get better separation effect. Thereby the gap has four gears which are 5 mm, 10 mm, 15 mm and 20 mm. When the crop is wet, a smaller gap between the axial-flow drum 11 and the sieve 12 should be chosen. When the crop is dry, a bigger gap between the axial-flow drum 11 and the sieve 12 should be chosen.

The operation process is as follows: After the ripe corn is harvested, the corn stalk on farmland is cut by the cutting table 1 of the agricultural harvester and conveyed into the conveyer 2 by the auger 8 of the cutting table. The cut corn stalk is conveyed to the tangential flow drum 10 by the chain harrow assembly 9 of the conveyer 2. Then the corn stalk is thrown into the separating unit 3 from the tangential flow drum 10. The corn stalk is torn by the operation of the axial-flow drum 11 and the sieve 12 to the strip-shaped peel of the corn stalk, irregularly blocky pulp and flake-like leaves. For the difference of the tearing extent in the process of tearing, the wide peel of the corn stalk forms the strip-shaped peel of the corn stalk, while the thin peel of the corn stalk forms the silk-shaped peel of the corn stalk. Among the silk-shaped peel, some silk-shaped peel of the corn stalk attaches to the flake of the corn stalk, while other does not attaches to the flake of the corn stalk; the bundle of the silk-shaped peel at least binds to a connection of a nodule with the peel of the corn stalk, or continuously binds to the flake of the corn stalk. The unattached silk-shaped peel forms single silk-shaped peel of which the length is shorter than the nodule length of the corn stalk. There are clear cracks on the corn stalk peel silk or partially continuous cracks on the corn stalk. Meanwhile, for the difference of the tearing extent, part of the pulp on the peel of the corn stalk is the free pulp stripped from the peel, while other part of the pulp on the peel of the corn stalk is the bonding pulp not being stripped from the peel. The irregular block-shaped pulp and flake-like leaves fall through the apertures on the sieve 12 for removing the pulp and leaves of the corn stalk, then are conveyed to the reciprocating sieve plate 13 at the rear of the harvester by the dispensing auger 14. The pulp and leaves are discharged from the rear of the harvester by the fan 15 and the shaking function of the reciprocating sieve plate 13. The strip-shaped peel of the corn stalk is dispersed by the dispersion device 6 and discharged. The operation is completed.

The irregular block-shaped pulp and flake-like leaves are dried in the field. In the process of drying, part of the irregular block-shaped pulp turns into graininess and part of flake-like leaves turns into fragment; the strip-shaped peel of the corn stalk is collected and packed when the moisture content of samples is 15%.

Example 2

A corn stalk material, wherein, the corn stalk material is the peel of the corn stalk; the peel of the corn stalk comprises the strip-shaped peel of the corn stalk with the residual pulp and the silk-shaped peel of the corn stalk; the content of the residual pulp on the strip-shaped peel of the corn stalk is 2.5%.

The mass percent of the strip-shaped peel of the corn stalk is 55 wt %, and the mass percent of the silk-shaped peel of the corn stalk is 45 wt %.

The corn stalk material is prepared by the method like the one of Example 1. The difference from Example 1 is that the strip-shaped peel of the corn stalk is collected and packed when the moisture content of samples is 45%.

Figure 3:
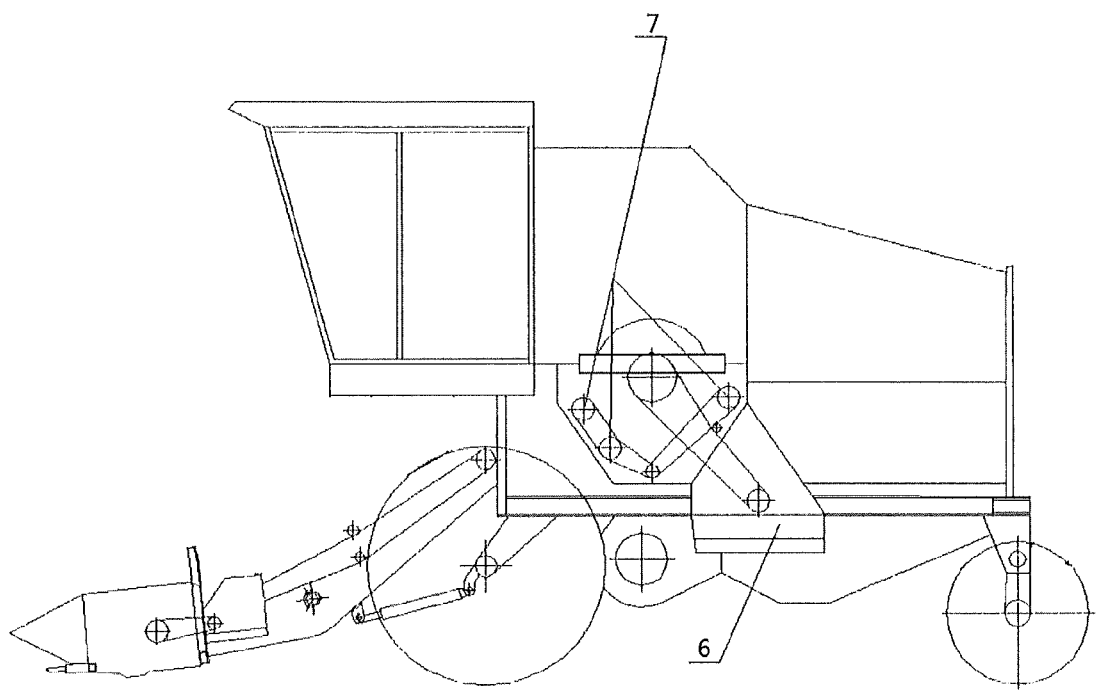
FIG. 3 is a mounted position schematic diagram of the dispersion device and the anti-blocking device in the agricultural harvester in the present invention.

On the basis of Example 1, an anti-blocking device is set on the agricultural harvester in the embodiment, as shown in FIG. 3. The embodiment is the same operation process as Example 1.

The anti-blocking device 7 is installed at the bottom of the sieve 12. If the harvested pulp and leaves of the corn stalk are wet, namely the moisture content is high, the irregular block-shaped pulp and flake-like leaves generated by the axial-flow drum and the sieve maybe adhere to the inner wall of the agricultural harvester after passing through the sieve. The accumulation of the pulp and leaves would block the sieve and reduce the separation effect of the corn stalk. The anti-blocking device is driven by the dispensing auger as the main driving, in the manner of chain drive. With continuous function of the anti-blocking device, the pulp and leaves adhering to the inner wall could get into the dispensing auger smoothly. The separating process is completed.

The anti-blocking device is a drum structure with circular teeth; the drum structure is connected with the power plant of the agriculture harvester. The drum structure is continuously rotated by the power plant, which make the pulp and leaves of the corn stalk at the bottom of the sieve 12 be removed.

In the embodiment, the rotating speed of the axial-flow drum 11 is 1000 r/min.

Example 3

A corn stalk material, wherein, the corn stalk material is the peel of the corn stalk; the peel of the corn stalk comprises the strip-shaped peel of the corn stalk with the residual pulp and the silk-shaped peel of the corn stalk; the content of the residual pulp on the strip-shaped peel of the corn stalk is 3%.

The mass percent of the strip-shaped peel of the corn stalk is 45 wt %, and the mass percent of the silk-shaped peel of the corn stalk is 55 wt %.

The corn stalk material is prepared by the method like the one of Example 1. The difference from Example 1 is that the strip-shaped peel of the corn stalk is collected and packed when the moisture content of samples is 30%.

The agricultural harvester is the same as examples 1.

In the embodiment, the rotating speed of the axial-flow drum 11 is 980 r/min.

Example 4

A corn stalk material, wherein, the corn stalk material is the peel of the corn stalk; the peel of the corn stalk comprises the strip-shaped peel of the corn stalk with the residual pulp and the silk-shaped peel of the corn stalk; the content of the residual pulp on the strip-shaped peel of the corn stalk is 1%.

The mass percent of the strip-shaped peel of the corn stalk is 38 wt %, and the mass percent of the silk-shaped of the corn stalk is 62 wt %.

The corn stalk material is prepared by the method like the one of Example 1. The difference from Example 1 is that the strip-shaped peel of the corn stalk is collected and packed when the moisture content of samples is 20%.

The agricultural harvester is the same as examples 2.

In the embodiment, the rotating speed of the axial-flow drum 11 is 960 r/min.

Example 5

In the embodiment, the corn stalk is harvested by the harvester of Example 1 when 3~5 leaves of the plant turn yellow and the stalk of the plant does not turn. The whole plant of the corn stalk is fed in the agricultural harvester automatically. The peel, pulp and leaves are obtained by removing leaves, cutting and expanding the stalk, and drawing out the pulp by the separating unit; the treated peel, pulp and leaves of corn stalk are drying in the field, and collected and packed to obtain the corn stalk material when the moisture content is up to the standard.

The components and morphology of the corn stalk material are as follows: the corn stalk material contains 16% moisture, 52% cellulose, 24% hemicelluloses, 14.5% lignin, 8% soluble sugar, 5.2% benzene-alcohol extraction and 4.2% ash. The crystallinity of cellulose is 50%. The corn stalk material is a mixture of the peel, pulp and leaves of the corn stalk. The mass percent of the pulp in the corn stalk is 3.3%. The corn stalk material is a mixture at least consisting of the strip-shaped peel of the corn stalk, the tows fiber of the peel of the corn stalk and the fiber of the corn stalk. The strip-shaped peel of the corn stalk has a certain length and width. The tows fiber of the peel of the corn stalk at least contains the fiber of nodules, the fiber of the peel of the corn stalk attaching to the nodules and the bundle of fibers. The corn stalk fiber at least contains filamentous corn stalk fiber. The pulp includes the free pulp separating from the corn stalk and the residual bonding pulp attaching to the strip-shaped peel of the corn stalk.

Example 6

In the embodiment, the corn stalk is harvested by the harvester of Example 1 when the corn has been harvested for 12 days and the moisture content of the corn stalk is 60~75%. The corn stalk material is collected and processed according to the method of Example 5.

The components and morphology of the corn stalk material are as follows: the corn stalk material contains moisture 40%, and the mass percent of the other major components in dry weight is: 35.5% cellulose, 22.7% hemicelluloses, 12.8% lignin, 6.4% soluble sugar, 3.4% benzene-alcohol extraction and 4.1% ash. The crystallinity of cellulose is 45%. The corn stalk material is a mixture of the peel, pulp and leaves of the corn stalk. The mass percent of the pulp in dry weight is 3.6%. The other morphology is the same as the one in Example 5.

Example 7

In the embodiment, the corn stalk is harvested by the harvester of Example 1 when all leaves of the plant turn yellow and 70%~100% stalk turns yellow. Corn stalk material is collected and processed according to the method of Example 5.

The components and morphology of the corn stalk material are as follows: the corn stalk material contains 16% moisture, 57.5% cellulose, 18% hemicelluloses, 17% lignin, 6% soluble sugar, 3.7% benzene-alcohol extraction and 3% ash. The crystallinity of cellulose is 75%, the corn stalk material is a mixture of the peel, pulp and leaves of the corn stalk. The mass percent of the pulp in dry weight is 2.3%. The other morphology is the same as the one of Example 5.

Example 8

A corn stalk material contains 15% moisture. The corn stalk material at least comprises the separated peel, pulp and leaves, which contains 35 wt % peel, 55 wt % leaves, 3 wt % pulp, and the remainder is the other components.

The corn stalk material for papermaking is prepared by the following steps:

After the corn stalk in ripe stage is harvested separated by the agricultural harvester in the present invention (as shown in FIGS. 1 and 2), the corn stalk is collected and packed as corn stalk material when the moisture content is up to 15%. The corn stalk material is prepared by the method like the one of Example 1. The difference from Example 1 is that the peel, pulp and leaves of the corn stalk are collected and packed when the moisture content of samples is 15%. The mass percent of the strip-shaped peel of the corn stalk is 15 wt %, and the mass percent of the silk-shaped peel of the corn stalk is 20 wt %. The mass percent of the free pulp is 2.5 wt %, and the mass percent of the bonding pulp is 0.5 wt %.

The agriculture harvester is the same as the one Example 1. The rotating speed of the axial-flow drum 11 is 950 r/min.

Example 9

A corn stalk material for papermaking contains 30% moisture. The corn stalk material at least comprises the separated peel, pulp and leaves, which contains 30 wt % peel, 58 wt % leaves, 5 wt % pulp, and the remainder is the other components.

The corn stalk material for papermaking is prepared by the following steps:

After the corn stalk in ripe stage is harvested separated by the agricultural harvester in the present invention (as shown in FIGS. 1 and 2), the corn stalk is collected and packed as corn stalk material when the moisture content is up to 30%.

The agriculture harvester is the same as the one of Example 1.

The mass percent of the strip-shaped peel of the corn stalk is 10 wt %, and the mass percent of the silk-shaped peel of the corn stalk is 20 wt %. The mass percent of the free pulp is 4.5 wt %, and the mass percent of the bonding pulp is 0.5 wt %. The fiber fineness of the peel of the corn stalk is 41.33 tex; the average width is 85.076 μm; the content of the fiber with average width being greater than or equal to 70 μm is 63.433%.

In the embodiment, the rotating speed of the axial-flow drum 11 is 980 r/min.

Example 10

The corn stalk material is prepared the following steps:

The corn stalk is harvested and processed by the harvester when the corn has been harvested for 10 days and the moisture content of the corn stalk is 60~75%. Whole plant of the corn stalk is fed in the agricultural harvester automatically. The peel, pulp and leaves are obtained by removing leaves, cutting and expanding the stalk, and drawing out the pulp by the separating unit; the treated peel, pulp and leaves of corn stalk are drying in the field, and collected and packed to obtain the corn stalk material when the moisture content is up to the standard.

The separating unit in the embodiment achieves to separate the stem of the corn stalk from the leaves by the extruding and kneading method. The extruding and kneading method refers to a method separating the stem from leaves by the combined action of grinding, rubbing and tearing. The separating unit particularly contains a feed channel, a pressure roller component and a leaves stripping component. The pressure roller component consists of two pressure rollers arranged up and down and an adjusting component for the gap of the pressure rollers. The harvested corn stalk is fed in the feed channel and squeezed by a pair of pressure rollers rotating at the same rotating speed in reverse directions. Most leaves are distributed on the two planes formed by the squeeze of the pressure roller. In the process of squeezing, the moisture in the stalk also is squeezed out, and the sugar in the stalk is further removed. Consequently, the sugar content of the corn stalk material is reduced. The corn stalk material can not easily mildew, its shelf life extends. Since the strength of the fiber of the corn stalk is still high for 10 days after the corn has been harvested, the rotating speed of the pressure roller is 300 r/min. The bonding strength between stem and leaves is reduced after the stalk is squeezed by the pressure roller. A part of leaves is removed by a brush roller. The stalk on which the leaves are removed is delivered by another pair of the pressure rollers. Since the moisture content of the stalk is high, the gap between the first pair of pressure rollers is 8~12 mm, and the gap between the second pair of pressure rollers is 6~8 mm, so that the moisture could be removed more efficiently and completely.

The brush roller is installed between the two pair of pressure rollers. The separation of the stem from leaves is achieved by the impingement and tearing effect of the tooth on the brush roller. Two brush rollers are installed on the upside in feeding direction, and one brush roller is installed on the downside in feeding direction. The rotating speed of the brush roller is 240~300 r/min, and it is 250~280 r/min in the embodiment. A part of leaves are removed by the leaves stripping component, and only the root of the leaves is reserved in the embodiment. The fiber content of the root of the leaves is high. Thereby, the yield and utilization of the corn stalk can be improved.

The components and morphology of the corn stalk material are as follows: the corn stalk material contains 30% moisture, and the mass percent of the other major components in dry weight is: 40.7% cellulose, 24.3% hemicelluloses, 12.2% lignin, 3.6% soluble sugar, 5.5% benzene-alcohol extraction and 6.1% ash. The crystallinity of the cellulose is 45%. The corn stalk material is a mixture of the peel, pulp and leaves of the corn stalk. The mass percent of the pulp in the corn stalk material is 3.5%. The other morphology is the same as the one in Example 5.

Experimental Example 1

Comparative Experiment for Papermaking

1. Pulping

The corn stalk material described in Example 1 of the present invention (abbreviated Experiment), the corn stalk material described in "the research on separating peel, pulp and Leaves of the corn stalk from each other and pulping" (abbreviated comparison 1) and the corn stalk with short filamentous structure described in "design and simulation of a rubbing and baling device of the combinative harvester for the corn stalk" (abbreviated comparison 2) are pulped by soda-anthraquinone method in the revolving digesters with 15 L capacity. Begin timing, when the temperature reaches 25° C., and slightly discharge the steam, after the temperature reaches 100° C. Alkali dosage is 16% (calculated as $Na_2O$); liquor ratio is 1:5; the maximum temperature is 160° C.; heating-up time is 90 min; incubation time is 60 min; anthraquinone dosage is 0.05%.

2. Bleaching

The pulp made from the peel of the corn stalk of the above material is bleached by the traditional CEH three-stage bleaching process.

Technological process is as follows: chloridizing (C)—washing—alkali treatment (E)—washing—hypochlorite bleaching (H)—washing. Total amount of chlorine is 8%. The other technological parameters are shown in FIG. 4.

3. Sheet-Making

Sheet-making test is conducted on the pulp of the corn stalk by PTI automatic Sheet-making apparatus. Quantity is 60 $g/m^2$, quantitative fluctuation is ±3.5%

Whiteness, opacity, yellowing value and physical strength of the paper are measured according to the standard methods. The results are illustrated in FIG. 5.

Compared to the Comparison 1, paper made from the corn stalk material the present invention has lower opacity and higher yellowing value, but it has higher tensile index, burst index, tear index and folding endurance. Since the pulp is not removed in Comparison 2, the existing pulp in the material causes the paper to be lower tensile index, burst index, tear index and folding endurance compared to the present invention. The fragility of the pulp maybe causes more serious yellowing phenomenon. Therefore, papermaking properties of the corn stalk material in the present invention is better than the one of Comparison 1 and Comparison 2.

The above-mentioned tests are also conducted on the corn stalk material of the other embodiments of this invention, and similar results are obtained Experimental Example 2

Harvesting and Storing Experiment on the Corn Stalk Material

Harvesting and storing comparative experiment are conducted on the corn stalk material of Example 1 in this invention and the corn stalk material for papermaking prepared by the prior art under the same conditions:

The corn stalk material of Example 1 is divided into three batch (Batch 1, Batch 2 and Batch 3), and the corn stalk material prepared by the prior art is divided into two batch (Comparison 1 and Comparison 2). The corn stalk material is packaged in a bale of 330 $kg/m^3$. The experiments are then carried out.

1. High Temperature Test

The corn stalk material obtained by the above method is stored in a clean and enclosed warehouse. The temperature of the warehouse is 40° C. The corn stalk material is stored for 15 days at 40% relative moisture. Samples are taken on the 5th day, the 10th day and the 15th day for detecting whether they have deteriorated or not. The results are shown in FIG. 6.

2. High Humidity Test

The corn stalk material obtained by the above method is stored in a clean and enclosed warehouse. Temperature of the warehouse is 25±2° C. The corn stalk material is stored for 15 days at 90±5% relative moisture. Samples are taken on the 5th day, the 10th day and the 15th day for detecting whether they have deteriorated or not. The results are shown in FIG. 7.

3. High Temperature and Humidity Test

The corn stalk material obtained by the above method is stored in a clean and enclosed warehouse. Temperature of the warehouse is 35±2° C. The corn stalk material is stored for 30 days at 70±5% relative moisture. Samples are taken on the 5th day, the 10th day, the 20th day and the 30th day for detecting whether they have deteriorated or not. The results are shown in FIG. 8.

The above-mentioned tests are also conducted on corn stalk material of the other embodiments of this invention, and similar results are obtained.

What is claimed is:

1. A method for manufacturing a corn stalk material wherein the corn stalk material comprises a peel of a corn stalk which is at least one material selected from the group consisting of a silk-shaped peel of the corn stalk and a strip-shaped peel of the corn stalk with residual pulp of the corn stalk, wherein a content of the residual pulp on the strip-shaped peel is less than 5%, the method comprising the steps:

1) using an agricultural harvester to harvest the corn stalk;

2) when harvesting, the corn stalk being separated by a mechanical method of extrusion, grind and rub, tear, crush or kneading, to obtain a pulp, a leaf and a peel of the corn stalk respectively; and 3) collecting a fibrous material when a moisture content of the peel of the corn stalk obtained from step 2) is 15~45%.

2. The method according to claim 1, wherein the corn stalk material further includes a free pulp separated from the peel of the corn stalk and a separated leaf.

3. The method according to claim 1, wherein the content of the residual pulp on the strip-shaped peel is less than 3%.

4. The method according to claim 3, wherein the content of the residual pulp on the strip-shaped peel is 0.5~2.5%.

5. The method according to claim 1, wherein a fiber fineness of the peel of the corn stalk is 38~42 tex; an average width is 82~88 μm; a content of the fiber with the average width greater than or equal to 70 μm is 60~65% in the corn stalk material.

6. The method according to claim 5, wherein the fiber fineness of the peel of the corn stalk is 39~41 tex; the average width is 84~86 μm; the content of the fiber with the average width greater than or equal to 70 μm is 62~64% in the corn stalk material.

7. The method according to claim 6, wherein the fiber fineness of the peel of the corn stalk is 41.33 tex; the average width is 85.076 μm; the content of the fiber with the average width greater than or equal to 70 μm is 63.433%.

8. The method according to claim 5, wherein,
the silk-shaped peel of the corn stalk comprises a unattached silk-shaped peel of the corn stalk and a bundle of a silk-shaped peel binding to the peel of the corn stalk after separating the peel, pulp and leaf from each other; a length of the strip-shaped peel of the corn stalk is less than 45 cm;
the bundle of the silk-shaped peel of the corn stalk further comprises the bundle of the silk-shaped peel binding to a connection of a nodule with the peel of the corn stalk, or the silk-shaped peel of the corn stalk partially continuously binding to the peel of the corn stalk; and there are partially continuous cracks on the peel of the corn stalk along the longitudinal direction.

9. The method according to claim 1, wherein, in step 2), the corn stalk is tore, crushed, and separated by a separating unit of the agricultural harvester, to obtain a pulp, a leaf and a peel of the corn stalk.

10. The method according to claim 1, wherein, in step 3), the pulp and leaf of the corn stalk are a feed, or fermented to produce lactic acid or alcohol.

11. The method according to claim 1, wherein an initial moisture content of the peel of the corn stalk obtained in step 2) is 50%~75%, and the method further comprising sun drying or air drying the corn stalk obtained in step 2).

12. An apparatus for preparing a corn stalk material comprising a peel of a corn stalk which is at least one material selected from the group consisting of a silk-shaped peel of the corn stalk and a strip-shaped peel of the corn stalk with residual pulp of the corn stalk, wherein a content of the residual pulp on the strip-shaped peel is less than 5%, the apparatus being an agricultural harvester,
the agricultural harvester comprising:
a chassis,
a power plant,
an electrical installation,
a hydraulic system,
a cab,
a cutting table for harvesting the crops located in the front of the chassis of the agriculture harvester,
a separating unit for separating the crop stalk, and
a conveyer for conveying the crop stalk between the said units,
wherein:
the separating unit is used for crushing the crop stalk and separating the peel, pulp and leaf of the crop stalk from each other, and the separating unit comprises a rotatable structure with multiple teeth on the peripheral which can crush the corn stalk and the sorghum stalk, and a structure with apertures through which the crushed pulp and leaf is leaked.

13. The apparatus according to claim 12, wherein the separating unit is used for tearing, crushing, and separating the peel, pulp and leaf of the corn stalk from each other; and the conveyer is used for conveying the harvested corn stalk to the separating unit which is used for tearing, crushing and separating the peel, pulp and leaf of the corn stalk from each other.

14. The apparatus according to claim 13, wherein the separating unit comprises an axial-flow drum for tearing, crushing, separating the peel, pulp and leaf of the corn stalk from each other, and a sieve for leaking the separated pulp and leaf.

\* \* \* \* \*